(12) United States Patent
Woods

(10) Patent No.: US 12,219,080 B2
(45) Date of Patent: Feb. 4, 2025

(54) ENHANCED EXPANDABLE SOCKET ACCESSORY SYSTEMS

(71) Applicant: Ian Woods, Brockton, MA (US)

(72) Inventor: Ian Woods, Brockton, MA (US)

( * ) Notice: Subject to any disclaimer, the term of this patent is extended or adjusted under 35 U.S.C. 154(b) by 187 days.

(21) Appl. No.: 18/101,097

(22) Filed: Jan. 24, 2023

(65) Prior Publication Data

US 2023/0247123 A1 Aug. 3, 2023

Related U.S. Application Data

(60) Provisional application No. 63/302,552, filed on Jan. 24, 2022.

(51) Int. Cl.
*H04M 1/04* (2006.01)

(52) U.S. Cl.
CPC ..................................... *H04M 1/04* (2013.01)

(58) Field of Classification Search
CPC ............. H04M 1/04; H04M 1/724094; H04M 1/72442
See application file for complete search history.

(56) References Cited

U.S. PATENT DOCUMENTS

2012/0234043 A1* 9/2012 Guerrero, II ......... A44C 5/0007
63/3.1
2017/0359095 A1* 12/2017 Fleckenstein .......... F16M 11/24

\* cited by examiner

*Primary Examiner* — Tuan D Nguyen
(74) *Attorney, Agent, or Firm* — JWIP & Patent Services, LLC; Jacob G. Weintraub, Esq.

(57) ABSTRACT

The present invention is directed to enhanced expandable socket accessory systems that are enhanced with the ability to maintain retention of the socket accessory within the receiving slot to resist vertical inertial force, e.g., resulting from jostling, bumping or jumping. In particular, novel form factors, including necklaces, are capable of utilizing the enhanced expandable socket accessory systems of the present invention.

21 Claims, 2 Drawing Sheets

ENHANCED EXPANDABLE SOCKET ACCESSORY SYSTEMS

RELATED APPLICATIONS

This application claims priority to U.S. Provisional Patent Application No. 63/302,552, filed on Jan. 24, 2022; the entirety of which is incorporated herein by reference.

BACKGROUND OF THE INVENTION

Expandable socket accessories, most popularly known as a "POPSOCKET™" are well-known for their convenience in attachment to a user device. These socket accessories have found numerous uses both for in-hand use, as well as for hands-free use. In general, the expandable socket comprises a platform affixable to a user device, a button spaced from the platform, and a collapsible mechanism coupled to the platform and the button, where the button may be received by a receiving slot.

In practical use, and on the go, the expandable socket affords the user the in-hand ability to have greater tactile control over the user device to which the expandable socket accessory is attached. Although such accessory functions well during physical motion with the user device in-hand, the accessory has failed to afford suitable stability in hands-free use where the button is positioned in the receiving slot.

Attempts at solving hands-free mobility have focused on design modifications relating to the shape and depth of the receiving slot. In particular, existing solutions have attempted to create locked slots or saddle positions in the receiving slots. However, such slot designs have failed to achieve success in retention of the socket accessory affixed to a user device, within the receiving slot, especially during vertical movement, e.g., resulting from jostling, bumping or jumping.

As such, there remains a need for expandable socket accessories that are enhanced with the ability to maintain retention within the receiving slot to resist the vertical inertial force, e.g., resulting from jostling, bumping or jumping.

SUMMARY OF THE INVENTION

Accordingly, the present invention is directed to enhanced expandable socket accessory systems that are enhanced with the ability to maintain retention of the socket accessory within the receiving slot to resist vertical inertial force, e.g., resulting from jostling, bumping or jumping. In particular, novel form factors, including necklaces, are capable of utilizing the enhanced expandable socket accessory systems of the present invention.

One aspect of the present invention is directed to an enhanced expandable socket accessory system comprising an expandable socket accessory for affixation to a user device comprising a platform affixable to the user device, a button spaced from the platform, and a collapsible mechanism coupled to the platform and the button, wherein the button comprises a first component of a vertical deterrence adhesion anchor; and a receiving slot suitable for receiving the button of the expandable socket accessory comprising an open-ended receiving slot collar and a second component of the vertical deterrence adhesion anchor, wherein the first component of the vertical deterrence adhesion anchor and the second component of the vertical deterrence adhesion anchor are positioned to reversibly interact when the button is placed in the receiver slot creating a completed vertical deterrence adhesion anchor with an adhesive strength suitable to resist the inertial force and that release adhesion upon application of separation force greater than the inertial resistance force of the vertical deterrence adhesion anchor.

Another aspect of the present invention is a vertical deterrence adhesion anchor conversion kit comprising an expandable socket accessory for affixation to a user device comprising a platform affixable to the user device, a button spaced from the platform, and a collapsible mechanism coupled to the platform and the button; and a receiving slot suitable for receiving the button of the expandable socket accessory comprising an open-ended receiving slot collar and a second component of a vertical deterrence adhesion anchor, wherein the second component of the vertical deterrence adhesion anchor and the button are positioned to reversibly interact when the button is placed in the receiver slot creating a completed vertical deterrence adhesion anchor with an adhesive strength suitable to resist the inertial force and that release adhesion upon application of separation force greater than the inertial resistance force of the vertical deterrence adhesion anchor.

BRIEF DESCRIPTION OF THE FIGURES

Advantages of the present systems and kits will be apparent from the following detailed description, which description should be considered in combination with the accompanying figures, which are not intended to limit the scope of the invention in any way.

DETAILED DESCRIPTION OF THE INVENTION

Figure 1:
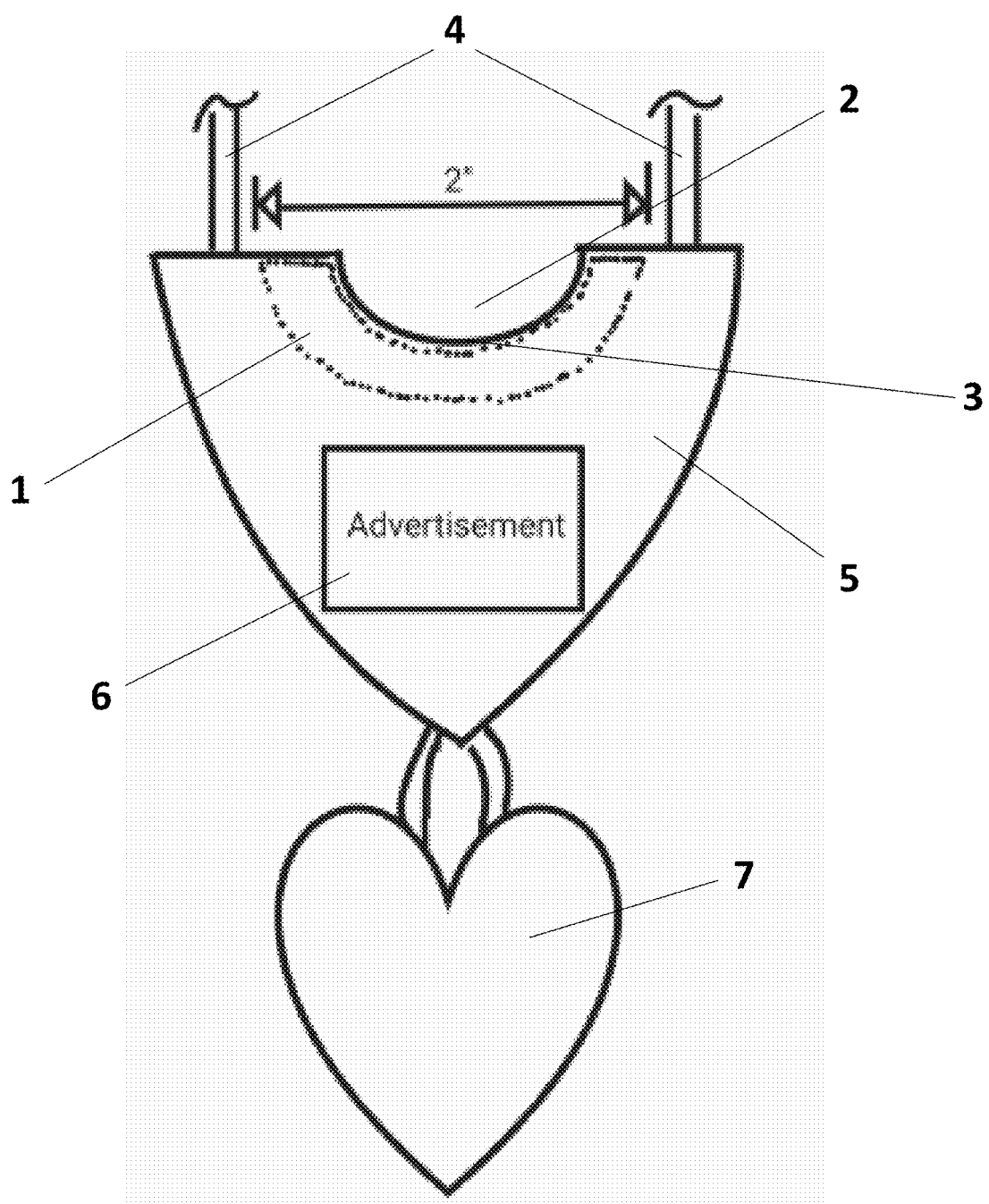
FIG. 1 depicts the front perspective of an exemplary receiving slot suitable for receiving the button of the expandable socket accessory that forms part of an enhanced expandable socket accessory system of the present invention. The receiving slot is in the form of a necklace and the dotted line depicts a magnetic second component of the vertical deterrence adhesion anchor on the underside of the receiving slot collar.

The present invention is directed to enhanced expandable socket accessory systems that are enhanced with the ability to maintain retention of the socket accessory within the receiving slot to resist vertical inertial force, e.g., resulting from jostling, bumping or jumping. In particular, novel form factors, including necklaces, are capable of utilizing the enhanced expandable socket accessory systems of the present invention. Such necklace form factors offer improved auditory effects that channels the audio from a user device, e.g., mobile device, associated with the systems of the present invention, i.e., enhanced audio accessibility.

The present invention, including systems and kits will be described with reference to the following definitions that, for convenience, are set forth below. Unless otherwise specified, the below terms used herein are defined as follows:

I. Definitions

As used herein, the term "a," "an," "the" and similar terms used in the context of the present invention (especially in the context of the claims) are to be construed to cover both the singular and plural unless otherwise indicated herein or clearly contradicted by the context.

The term "about" is used herein in reference to the degree or extent of the term which it modifies, and that such extent may be 100% or near to but not exactly 100% of the modified term; industry accepted standards will assist in defining the quantitative aspects of how "near" 100% is defined. In particular embodiments, the term "about" indicates ±2%, ±1% or ±0.5%. In a particular embodiment, for example, the language "about 2 inches" would be exactly 2 inches; and in an alternative particular embodiment, for example, the language "about 2 inches" would mean 2 inches ±2%, 2 inches ±1%, or 2 inches ±0.5%.

The term "adhesion" is used herein, to describe the adhesive force between the first component of a vertical deterrence adhesion anchor and the second component of a vertical deterrence adhesion anchor.

The language "adhesion anchor" is used herein to describe a two component adhesion system that anchors one component to the other, for example a button of an expandable socket accessory of the present invention to a receiving slot suitable for receiving the button. The "vertical deterrence adhesion anchors" of the present invention are adhesion anchors that afford an adhesive strength suitable to resist inertial force, e.g., resulting from jostling, bumping or jumping.

The language "and/or" is used herein to mean both "and" in the conjunctive form and "or" in the disjunctive form.

The language "collapsed configuration" is used herein to describe the collapsible mechanism coupled to the platform and the button when it is in the minimized/closed/unexpanded orientation.

The language "expanded configuration" is used herein to describe the collapsible mechanism coupled to the platform and the button when it is in the maximized/open orientation. In certain embodiments, this language includes partially open or expanded positions.

The language "inertial resistance force" is used herein to describe the force opposite and greater than the up/out force, or inertial force, of the expandable socket accessory from the receiving slot, created by the upward/outward movement by the jostling, bumping or jumping of the user or mobile device. The inertial resistance force is sufficient force to resist separation of a first component of a vertical deterrence adhesion anchor from a second component of a vertical deterrence adhesion anchor, caused by the inertia of the expandable socket accessory created by the upward/outward movement of jostling, bumping or jumping of the user or mobile device (or alternatively stated, the inertial resistance force is the force to maintain adhesion of these two components and resisting separation from inertial force); therefore retaining the expandable socket accessory in place in the receiving slot. In certain embodiments, the inertial resistance force may be overcome or exceeded by the use of physical separation force generated by prying/pulling with the user's hand, e.g., two hands; releasing the expandable socket accessory from the receiving slot.

The language "separation force" is used herein to describe the force applied by a user to separate the components of the completed vertical deterrence adhesion anchor.

The language "user device" is used herein to describe any device capable of use with the enhanced expandable socket accessory system of the invention, i.e., where the expandable socket accessory may be mounted to the device or a protective case holding the device and retained by a receiving slot. In certain embodiments, the user the device is a mobile device. Certain examples of a user mobile device, include, but are not limited to a cellphone or a portable media player (or the case holding the cellphone or portable media player). In certain embodiments, the user device comprises an integrated speaker.

II. Enhanced Expandable Socket Accessory System of the Invention

One embodiment of the present invention provides an enhanced expandable socket accessory system comprising
    an expandable socket accessory for affixation to a user device comprising a platform affixable to the user device, a button spaced from the platform, and a collapsible mechanism coupled to the platform and the button, wherein the button comprises a first component of a vertical deterrence adhesion anchor; and
    a receiving slot suitable for receiving the button of the expandable socket accessory comprising an open-ended receiving slot collar and a second component of the vertical deterrence adhesion anchor,
wherein the first component of the vertical deterrence adhesion anchor and the second component of the vertical deterrence adhesion anchor are positioned to reversibly interact when the button is placed in the receiver slot creating a completed vertical deterrence adhesion anchor with an adhesive strength suitable to resist the inertial force and that release adhesion upon application of separation force greater than the inertial resistance force of the vertical deterrence adhesion anchor.

In certain embodiments of the present invention, the first component of the vertical deterrence adhesion anchor and the second component of the vertical deterrence adhesion anchor reversibly interact through magnetic interaction (e.g., the first component is a magnetic material, and the second component material is a metal/partially metallic or vice versa, i.e., a magnetic pair).

In certain embodiments of the present invention, the first component of the vertical deterrence adhesion anchor and the second component of the vertical deterrence adhesion anchor reversibly interact through hook and loop interaction (e.g., VELCRO™).

In certain embodiments of the present invention, the first component of the vertical deterrence adhesion anchor and the second component of the vertical deterrence adhesion anchor reversibly interact through renewable adhesive (e.g., symmetrical or asymmetrical, e.g., renewable sticky material on the receiving slot).

In certain embodiments of the present invention, the user device is a mobile device. In certain embodiments, the mobile device is a cellphone or portable media player (or the case holding the cellphone or portable media player). In particular embodiments, the platform is adapted to engage a portion of the cellphone, portable media player, or case retaining same.

In certain embodiments of the present invention, the receiving slot further comprises a support line from which the receiving slot may be hanged. In certain embodiments, the support line is a neck support line. In certain embodiments, the receiver slot forms part of necklace design (e.g., including advertisement designs, logos, and the like). Such necklace form factors offer improved auditory effects that channels the audio from a mobile device associated with the systems of the present invention, i.e., enhanced audio accessibility.

A. Expandable Socket Accessory

The enhanced expandable socket accessory systems of the present invention comprise an expandable socket accessory for affixation to a user device comprising a platform affixable to the user device, a button spaced from the platform, and a collapsible mechanism coupled to the platform and the button, wherein the button comprises a first component of a vertical deterrence adhesion anchor. The platform, well-known in the socket accessory field, is a relatively flat base for mounting the enhanced expandable socket accessory to the user device (i.e., independent of the two-dimensional shape), which is coupled to the button through the collapsible mechanism. The button, also well-known in the socket accessory field, is coupled to the collapsible mechanism, and serves as the structural component for sliding behind the receiving slot for horizontal retention, limitations on the shape for which would only be dependent on the thickness of the button being able to fit behind the receiving slot once in position and size preventing horizontal exit once in position in the slot.

In certain embodiments of the present invention, the platform affixation to the user device may be permanent or semi-permanent.

In certain embodiments of the present invention, the collapsible mechanism comprises a plurality of discrete sections movable relative to one another to move the expandable socket between a collapsed configuration and an expanded configuration.

In certain embodiments of the present invention, the first component of the vertical deterrence adhesion anchor is positioned on the internal side the button.

In certain embodiments of the present invention, the first component of the vertical deterrence adhesion anchor is positioned on the external side the button.

In certain embodiments of the present invention, the first component of the vertical deterrence adhesion anchor comprises any shape suitable to achieve alignment with the second component of the vertical deterrence adhesion anchor. In particular embodiments, the first component shape matches the button shape. In particular alternative embodiments, the shape is only partial match to the button shape, for example, a ring or a partial ring, e.g., about a half ring.

In certain embodiments of the present invention, the first component of the vertical deterrence adhesion anchor comprises more than one fragment, i.e., the first component is made of two or more pieces suitable for use as the first component.

In certain embodiments of the present invention, the button is about 2 inches in diameter, e.g., 2 inches.

In certain embodiments of the present invention, the first component of the vertical deterrence adhesion anchor and the second component of the vertical deterrence adhesion anchor reversibly interact through magnetic interaction (e.g., the first component is a magnetic material, and the second component material is a metal/partially metallic or vice versa, i.e., a magnetic pair).

In certain embodiments of the present invention, the first component of the vertical deterrence adhesion anchor and the second component of the vertical deterrence adhesion anchor reversibly interact through hook and loop interaction (e.g., VELCRO™).

In certain embodiments of the present invention, the first component of the vertical deterrence adhesion anchor and the second component of the vertical deterrence adhesion anchor reversibly interact through renewable adhesive (e.g., symmetrical or asymmetrical, e.g., renewable sticky material on the receiving slot). In certain embodiments, the renewable adhesive is symmetrical, or the adhesive is on both the first component and second component. In certain embodiments, the renewable adhesive is asymmetrical, or the adhesive is on one of the first component or second component and the other component is capable of receiving the adhesive.

B. Receiving Slot

The enhanced expandable socket accessory systems of the present invention comprise a receiving slot suitable for receiving the button of the expandable socket accessory comprising an open-ended receiving slot collar and a second component of the vertical deterrence adhesion anchor. The receiving slot collar is the structural area of the receiving slot that is designed to receive the button (i.e., measured from the outer edge of the receiving slot collar), on which the second component of the vertical deterrence adhesion anchor is positioned, and which offers the structural resistance preventing horizontal passage of the button through the slot. In certain embodiments of the present invention, the receiving slot is suitable for receiving the button, e.g., in the expanded configuration, by fitting the button into the slot so that the expandable socket accessory is retained in the slot; and where the button would be retained in the slot while the expanded collapsible mechanism coupling the platform and the button passes from the button through the receiving slot (towards the platform affixed to the user device).

In certain embodiments of the present invention, the second component of the vertical deterrence adhesion anchor is positioned on the inner facing area (i.e., the side against the wearer and opposite the visible jewelry or advertisement).

In certain embodiments of the present invention, the second component of the vertical deterrence adhesion anchor is positioned to suitably reversibly interact with the first component of the vertical deterrence adhesion anchor comprising any shape suitable to achieve alignment. In particular embodiments, the shape of the second component is a partial ring, e.g., about a half ring.

In certain embodiments of the present invention, the receiving slot collar is about 2 inches, e.g., 2 inches, and configured to receive about a 2 inch button and sufficiently align the second component of the vertical deterrence anchor with the first component of the vertical deterrence adhesion anchor. In particular embodiments, the about half ring shape of the second component is aligned to adhere with the first component when the button is placed in the receiving slot collar.

In certain embodiments of the present invention, the second component of the vertical deterrence adhesion anchor is positioned on the outer facing side of the receiving slot collar (i.e., the side not against the wearer and the same side as the visible jewelry or advertisement).

In certain embodiments of the present invention, the second component of the vertical deterrence adhesion anchor comprises more than one fragment, i.e., the second component is made of two or more pieces suitable for use as the second component.

In certain embodiments of the present invention, the second component of the vertical deterrence adhesion anchor and first component of the vertical deterrence adhesion anchor reversibly interact through magnetic interaction (e.g., the first component is a magnetic material, and the second component material is a metal/partially metallic or vice versa, i.e., a magnetic pair).

In certain embodiments of the present invention, the second component of the vertical deterrence adhesion anchor and the first component of the vertical deterrence adhesion anchor reversibly interact through hook and loop interaction (e.g., VELCRO™).

In certain embodiments of the present invention, the second component of the vertical deterrence adhesion anchor and the first component of the vertical deterrence adhesion anchor reversibly interact through renewable adhesive (e.g., symmetrical or asymmetrical, e.g., renewable sticky material on the receiving slot). In certain embodiments, the renewable adhesive is symmetrical, or the adhesive is on both the second component and first component. In certain embodiments, the renewable adhesive is asymmetrical, or the adhesive is on one of the second component or first component and the other component is capable of receiving the adhesive

III. Vertical Deterrence Adhesion Anchor Conversion Kits of the Invention

Another embodiment of the present invention provides a vertical deterrence adhesion anchor conversion kit comprising
- an expandable socket accessory for affixation to a user device comprising a platform affixable to the user device, a button spaced from the platform, and a collapsible mechanism coupled to the platform and the button; and
- a receiving slot suitable for receiving the button of the expandable socket accessory comprising an open-ended receiving slot collar and a second component of a vertical deterrence adhesion anchor, wherein the second component of the vertical deterrence adhesion anchor and the button are positioned to reversibly interact when the button is placed in the receiver slot creating a completed vertical deterrence adhesion anchor with an adhesive strength suitable to resist the inertial force and that release adhesion upon application of separation force greater than the inertial resistance force of the vertical deterrence adhesion anchor. In certain embodiments, the vertical deterrence adhesion anchor conversion kit further comprises a first component of the vertical deterrence adhesion anchor that is affixable to the button.

In certain embodiments of the vertical deterrence adhesion anchor conversion kit of the present invention, the receiving slot further comprises a support line from which the receiving slot may be hanged. In certain embodiments, the support line is a neck support line. In certain embodiments, the receiver slot forms part of necklace design (e.g., including advertisement designs, logos, and the like). Such necklace form factors offer improved auditory effects that channels the audio from a mobile device associated with the systems of the present invention, i.e., enhanced audio accessibility. In particular embodiments, one or more pendants may be connected reversibly or irreversibly to the necklace.

In certain embodiments of the vertical deterrence adhesion anchor conversion kit of the present invention, the first component of the vertical deterrence adhesion anchor comprises more than one fragment, i.e., the first component is made of two or more pieces suitable for use as the first component.

In certain embodiments of the vertical deterrence adhesion anchor conversion kit of the present invention, the first component of the vertical deterrence adhesion anchor is positioned on the internal side the button.

In certain embodiments of the vertical deterrence adhesion anchor conversion kit of the present invention, the first component of the vertical deterrence adhesion anchor is positioned on the external side the button.

In certain embodiments of the vertical deterrence adhesion anchor conversion kit of the present invention, the first component of the vertical deterrence adhesion anchor comprises any shape suitable to achieve alignment with the second component of the vertical deterrence adhesion anchor. In particular embodiments, the first component shape matches the button shape. In particular alternative embodiments, the shape is only partial match to the button shape, for example, a ring or a partial ring, e.g., about a half ring.

In certain embodiments of the vertical deterrence adhesion anchor conversion kit of the present invention, the first component of the vertical deterrence adhesion anchor comprises more than one fragment, i.e., the first component is made of two or more pieces suitable for use as the first component.

In certain embodiments of the vertical deterrence adhesion anchor conversion kit of the present invention, the button is about 2 inches in diameter, e.g., 2 inches.

In certain embodiments of the vertical deterrence adhesion anchor conversion kit of the present invention, the platform affixation to the user device is permanent or semi-permanent. In particular embodiments, the platform is adapted to engage a portion of the cellphone, portable media player, or case retaining same.

In certain embodiments of the vertical deterrence adhesion anchor conversion kit of the present invention, the second component of the vertical deterrence adhesion anchor is positioned on the inner facing area (i.e., the side against the wearer and opposite the visible jewelry or advertisement).

In certain embodiments of the vertical deterrence adhesion anchor conversion kit of the present invention, the second component of the vertical deterrence adhesion anchor is positioned to suitably reversibly interact with the first component of the vertical deterrence adhesion anchor comprising any shape suitable to achieve alignment. In particular embodiments, the shape of the second component is a partial ring, e.g., about a half ring.

In certain embodiments of the vertical deterrence adhesion anchor conversion kit of the present invention, the receiving slot collar is about 2 inches, e.g., 2 inches, and configured to receive about a 2 inch button and sufficiently align the second component of the vertical deterrence anchor with the first component of the vertical deterrence adhesion anchor. In particular embodiments, the about half ring shape of the second component is aligned to adhere with the first component when the button is placed in the receiving slot collar.

In certain embodiments of the vertical deterrence adhesion anchor conversion kit of the present invention, the second component of the vertical deterrence adhesion anchor is positioned on the outer facing side of the receiving slot collar (i.e., the side not against the wearer and the same side as the visible jewelry or advertisement).

In certain embodiments of the vertical deterrence adhesion anchor conversion kit of the present invention, the second component of the vertical deterrence adhesion anchor comprises more than one fragment, i.e., the second component is made of two or more pieces suitable for use as the second component.

In certain embodiments of the vertical deterrence adhesion anchor conversion kit of the present invention, the second component of the vertical deterrence adhesion anchor and first component of the vertical deterrence adhesion anchor reversibly interact through magnetic interaction (e.g., the first component is a magnetic material, and the second component material is a metal/partially metallic or vice versa, i.e., a magnetic pair).

In certain embodiments of the vertical deterrence adhesion anchor conversion kit of the present invention, the second component of the vertical deterrence adhesion anchor and the first component of the vertical deterrence adhesion anchor reversibly interact through hook and loop interaction (e.g., VELCRO™).

In certain embodiments of the vertical deterrence adhesion anchor conversion kit of the present invention, the second component of the vertical deterrence adhesion anchor and the first component of the vertical deterrence adhesion anchor reversibly interact through renewable adhesive (e.g., symmetrical or asymmetrical, e.g., renewable sticky material on the receiving slot). In certain embodiments, the renewable adhesive is symmetrical, or the adhesive is on both the first component and second component. In certain embodiments, the renewable adhesive is asymmetrical, or the adhesive is on one of the first component or second component and the other component is capable of receiving the adhesive.

In certain embodiments of the vertical deterrence adhesion anchor conversion kit of the present invention, the user device is a mobile device, e.g., cellphone, portable media player, or a case retaining same.

In certain embodiments of the vertical deterrence adhesion anchor conversion kit of the present invention, the collapsible mechanism comprises a plurality of discrete sections movable relative to one another to move the expandable socket between a collapsed configuration and an expanded configuration.

IV. Design Aspects of the Invention

Independent of the utility related to the systems and kits of the present invention, the ornamental appearance of any novel design provided herein is intended to be part of this invention, for example, each of the perspective view in FIG. 1 and FIG. 2, which may form an independent or combined ornamental appearance of the enhanced expandable socket accessory systems described herein.

Accordingly, one embodiment of the present invention provide an ornamental design for an enhanced expandable socket accessory system as shown and described.

EXEMPLIFICATION

Having thus described the invention in general terms, reference will now be made to exemplary embodiments, and the accompanying drawings of exemplary embodiments, which are not necessarily drawn to scale, and which are not intended to be limiting in any way.

In this respect, it is to be understood that the invention is not limited in its application to the details of construction and to the arrangements of the components set forth in the following description or illustrated in the Figures. The invention is capable of other embodiments and of being practiced and carried out in various ways. Also, it is to be understood that the phraseology and terminology employed herein are for the purpose of description and should not be regarded as limiting.

Example 1

Enhanced Expandable Socket Accessory System

An exemplary embodiment of the enhanced expandable socket accessory system comprises an expandable socket accessory and a receiving slot suitable for receiving the button of the expandable socket accessory.

FIG. 1 depicts the front perspective of an exemplary receiving slot 2 suitable for receiving the button 8 of the expandable socket accessory that forms part of an enhanced expandable socket accessory system of the present invention. The receiving slot 2 is in the form of a necklace and the dotted line depicts a magnetic second component 1 of the vertical deterrence adhesion anchor that is on the other side of the front perspective. The receiving slot 2 is suitable for receiving the button 8 of the expandable socket accessory comprising an open-ended receiving slot collar 3 and a second component 1 of the vertical deterrence adhesion anchor. The receiving slot collar 3, is capable of receiving a 2 inch sized button 8.

The receiving slot further comprises a support line 4 from which the receiving slot may be hanged, which is a neck support line. The receiver slot forms part of necklace design 5 (e.g., including advertisement 6 designs, logos, and the like). Further, one or more pendants 7 may be connected reversibly or irreversibly to the necklace.

Figure 2A:
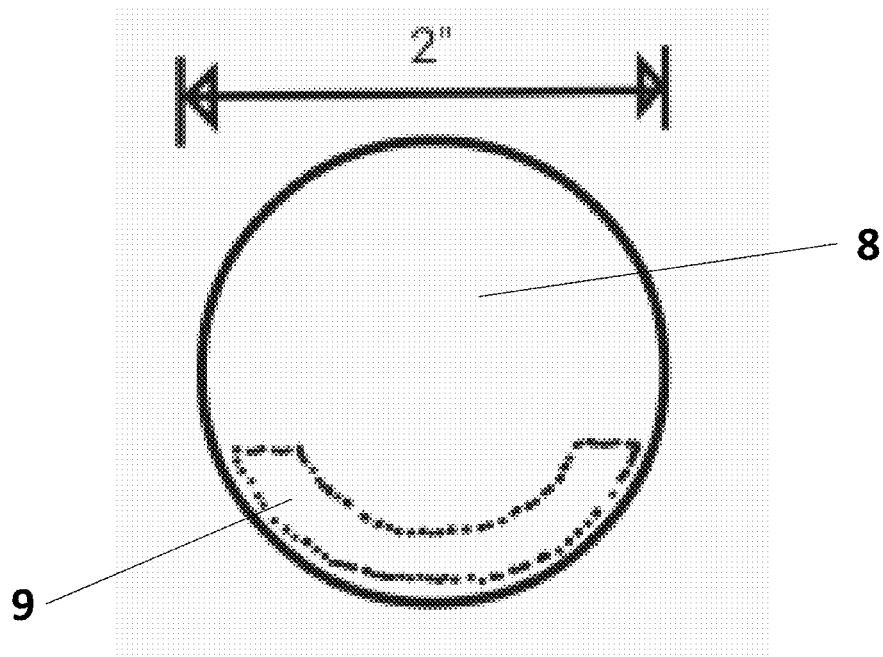
FIG. 2A depicts the top down perspective of an exemplary button of an expandable socket accessory for affixation to a user device that forms part of an enhanced expandable socket accessory system of the present invention, wherein the indication by dotted lines shows a magnetic first component of a vertical deterrence adhesion anchor located on the inner part of the button.
Figure 2B:
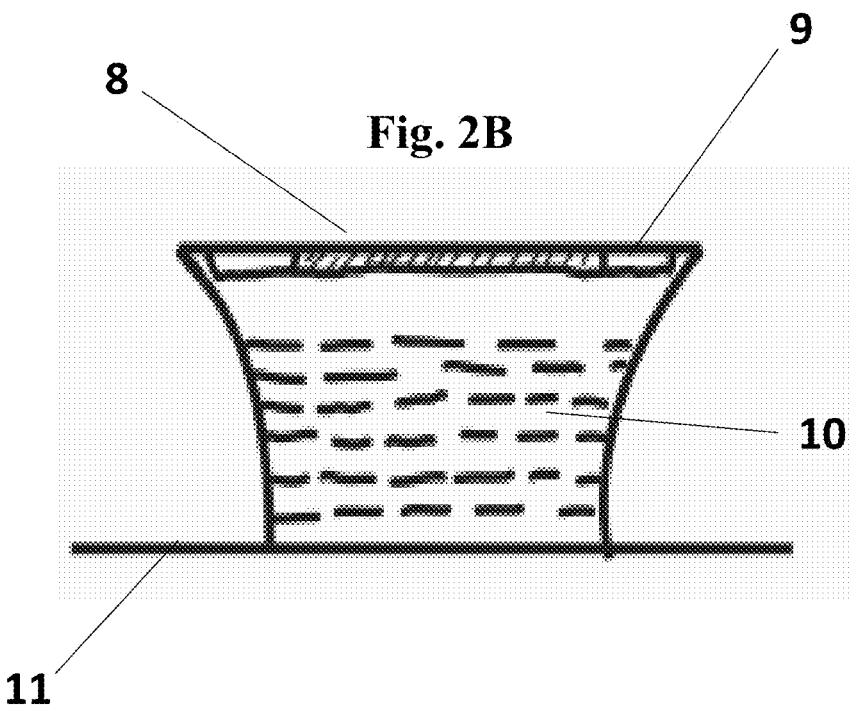
FIG. 2B depicts a cross-sectional side view of an expandable socket accessory of the present invention, depicting a button spaced from the platform, and the collapsible mechanism coupled to the platform and the button comprising a plurality of discrete sections movable relative to one another to move the expandable socket between a collapsed configuration and an expanded configuration, and also depicting the magnetic first component of the vertical deterrence adhesion anchor on the underside of the button.

FIG. 2A depicts the top down perspective of an exemplary button of an expandable socket accessory for affixation to a user device that forms part of an enhanced expandable socket accessory system of the present invention, wherein the indication by dotted lines shows a magnetic first component 9 of a vertical deterrence adhesion anchor located on the inner part of the button 8 as a half ring shape. FIG. 2B depicts a cross-sectional side view of an expandable socket accessory of the present invention, depicting a button 8 spaced from the platform 11, and the collapsible mechanism 10 coupled to the platform 11 affixable to the user device and the button 8, and also depicting the magnetic first component 9 of the vertical deterrence adhesion anchor on the underside of the button 8.

The first component 9 of the vertical deterrence adhesion anchor and the second component 1 of the vertical deterrence adhesion anchor are positioned to reversibly interact when the button 8 is placed in the receiver slot 2 creating a completed vertical deterrence adhesion anchor with an adhesive strength suitable to resist the inertial force, and that release adhesion upon application of separation force greater than the inertial resistance force of the vertical deterrence adhesion anchor. The first component 9 of the vertical deterrence adhesion anchor and the second component 1 of the vertical deterrence adhesion anchor reversibly interact through magnetic interaction (e.g., the first component 9 is a magnetic material, and the second component 1 material is a metal, i.e., a magnetic pair).

Further, the collapsible mechanism 10 includes a plurality of discrete sections movable relative to one another to move the expandable socket between a collapsed configuration and an expanded configuration.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

What is claimed is:

1. An enhanced expandable socket accessory system comprising
    an expandable socket accessory for affixation to a user device comprising a platform affixable to the user device, a button spaced from the platform, and a collapsible mechanism coupled to the platform and the button, wherein the button comprises a first component of a vertical deterrence adhesion anchor; and
    a receiving slot suitable for receiving the button of the expandable socket accessory comprising an open-ended receiving slot collar and a second component of the vertical deterrence adhesion anchor,
wherein the first component of the vertical deterrence adhesion anchor and the second component of the vertical deterrence adhesion anchor are positioned to reversibly interact when the button is placed in the receiver slot creating a completed vertical deterrence adhesion anchor with an adhesive strength suitable to resist the inertial force and that release adhesion upon application of separation force greater than the inertial resistance force of the vertical deterrence adhesion anchor.

2. The enhanced expandable socket accessory system of claim 1, wherein the receiving slot further comprises a support line from which the receiving slot may be hanged.

3. The enhanced expandable socket accessory system of claim 2, wherein the support line is a neck support line.

4. The enhanced expandable socket accessory system of claim 2, wherein the receiver slot forms part of necklace design.

5. The enhanced expandable socket accessory system of claim 1, wherein the first component of the vertical deterrence adhesion anchor is positioned on the internal side the button.

6. The enhanced expandable socket accessory system of claim 1, wherein the first component of the vertical deterrence adhesion anchor is positioned on the external side the button.

7. The enhanced expandable socket accessory system of claim 1, wherein the first component of the vertical deterrence adhesion anchor comprises more than one fragment.

8. The enhanced expandable socket accessory system of claim 1, wherein the first component of the vertical deterrence adhesion anchor and the second component of the vertical deterrence adhesion anchor reversibly interact through magnetic interaction.

9. The enhanced expandable socket accessory system of claim 1, wherein the first component of the vertical deterrence adhesion anchor and the second component of the vertical deterrence adhesion anchor reversibly interact through hook and loop interaction.

10. The enhanced expandable socket accessory system of claim 1, wherein the first component of the vertical deterrence adhesion anchor and the second component of the vertical deterrence adhesion anchor reversibly interact through renewable adhesive.

11. The enhanced expandable socket accessory system of claim 1, wherein the user device is a mobile device.

12. A vertical deterrence adhesion anchor conversion kit comprising
    an expandable socket accessory for affixation to a user device comprising a platform affixable to the user device, a button spaced from the platform, and a collapsible mechanism coupled to the platform and the button; and
    a receiving slot suitable for receiving the button of the expandable socket accessory comprising an open-ended receiving slot collar and a second component of a vertical deterrence adhesion anchor,
wherein the second component of the vertical deterrence adhesion anchor and the button are positioned to reversibly interact when the button is placed in the receiver slot creating a completed vertical deterrence adhesion anchor with an adhesive strength suitable to resist the inertial force and that release adhesion upon application of separation force greater than the inertial resistance force of the vertical deterrence adhesion anchor.

13. The vertical deterrence adhesion anchor conversion kit of claim 12, further comprising a first component of the vertical deterrence adhesion anchor that is affixable to the button.

14. The vertical deterrence adhesion anchor conversion kit of claim 13, wherein the first component of the vertical deterrence adhesion anchor and the second component of the vertical deterrence adhesion anchor reversibly interact through magnetic interaction.

15. The vertical deterrence adhesion anchor conversion kit of claim 13, wherein the first component of the vertical deterrence adhesion anchor and the second component of the vertical deterrence adhesion anchor reversibly interact through hook and loop interaction.

16. The vertical deterrence adhesion anchor conversion kit of claim 13, wherein the first component of the vertical deterrence adhesion anchor and the second component of the vertical deterrence adhesion anchor reversibly interact through renewable adhesive.

17. The vertical deterrence adhesion anchor conversion kit of claim 12, wherein the receiving slot further comprises a support line from which the receiving slot may be hanged.

18. The vertical deterrence adhesion anchor conversion kit of claim 17, wherein the support line is a neck support line.

19. The vertical deterrence adhesion anchor conversion kit of claim 17, wherein the receiver slot forms part of necklace design.

20. The vertical deterrence adhesion anchor conversion kit of claim 12, wherein the first component of the vertical deterrence adhesion anchor comprises more than one fragment.

21. The vertical deterrence adhesion anchor conversion kit of claim 12, wherein the user device is a mobile device.

\* \* \* \* \*